United States Patent [19]
Hedlund et al.

[11] Patent Number: 6,109,217
[45] Date of Patent: Aug. 29, 2000

[54] SNOWMOBILE WITH IMPROVED COOLING SYSTEM

[75] Inventors: Jan M. Hedlund; Jack R. Olson; Lyle J. Dahlgren, all of Roseau; Richard H. Bates, Jr., Badger; Aaron J. Johnson, Roseau, all of Minn.

[73] Assignee: Polaris Industries Inc., Minneapolis, Minn.

[21] Appl. No.: 09/223,437

[22] Filed: Dec. 30, 1998

[51] Int. Cl.[7] .................................................. F01P 9/00
[52] U.S. Cl. ................................. 123/41.01; 123/41.51; 180/68.4
[58] Field of Search .......................... 123/41.01, 41.29, 123/41.51; 180/180, 181, 182, 184, 186, 190, 68.1, 68.4, 68.6

[56] References Cited

U.S. PATENT DOCUMENTS

| | | | |
|---|---|---|---|
| 3,835,948 | 9/1974 | Duclo | 180/5 R |
| 3,901,335 | 8/1975 | Johnson | 180/5 R |
| 3,970,164 | 7/1976 | Suzuki | 180/68 R |
| 4,249,626 | 2/1981 | Fields et al. | 180/54 A |
| 5,129,473 | 7/1992 | Boyer | 180/68.1 |
| 5,152,255 | 10/1992 | Fukuda | 123/41.33 |
| 5,167,294 | 12/1992 | Gessinger | 180/190 |
| 5,232,066 | 8/1993 | Schnelker | 180/190 |
| 5,568,840 | 10/1996 | Nagata et al. | 180/190 |
| 5,857,385 | 1/1999 | Takeuchi | 74/489 |
| 5,862,662 | 1/1999 | Fukuda et al. | 60/313 |
| 5,957,230 | 9/1999 | Harano et al. | 180/68.4 |
| 5,992,552 | 11/1999 | Eto | 180/190 |

*Primary Examiner*—Noah P. Kamen
*Attorney, Agent, or Firm*—Fredrikson & Byron, P.A.

[57] ABSTRACT

A snowmobile having a liquid-cooled engine with an improved cooling system is disclosed. The snowmobile has a chassis with a drive tunnel. Horizontal footrests extend laterally from opposite sides of the chassis. The snowmobile also has left and right elongate side coolers that dissipate heat generated by the engine. The side coolers have a hollow interior that is in fluid communication with liquid coolant passages in the engine. Each cooler extends longitudinally and is mounted at an outer edge of a respective footrest to form a footwell. The snowmobile has a pump that circulates coolant throughout the coolant circuit formed by the side coolers and the internal passages of the engine. The side coolers may also contain heat exchanging anti-skid studs that extend outward from the surface of each side cooler. The snowmobile may also contain front and rear heat exchangers connected within the coolant circuit and positioned at the front and rear ends of the tunnel, respectively.

25 Claims, 6 Drawing Sheets

SNOWMOBILE WITH IMPROVED COOLING SYSTEM

FIELD OF THE INVENTION

The present invention relates to snowmobiles, and in particular, to snowmobiles having an improved cooling system.

BACKGROUND OF THE INVENTION

Past snowmobiles have used liquid cooling systems to cool their internal combustion engines. Snowmobiles with these liquid-cooled engines often have auxiliary radiators or heat exchangers spaced away from the engine itself. In some of these snowmobiles, the radiators are positioned within the drive tunnel that is within the snowmobile chassis. The drive track, also disposed within the drive tunnel, carries and circulates snow within the drive tunnel as the track moves. The radiators are positioned adjacent the track so that some of the snow carried by the track will be thrown at the radiators to provide a heat exchange. The melting of snow requires a substantial amount of heat which is removed from the coolant circulated in the radiators.

Since space is limited, radiators often have a plurality of fins to improve the heat exchange without substantially increasing the size or number of the radiators. On snowmobiles with larger engines, though, using front and back radiators with fins may still not provide sufficient cooling.

Aside from circulating snow within the tunnel, the drive track in typical snowmobiles will throw snow onto the snowmobile's operator foot area. Since typical snowmobiles provide recessed footwells for a rider's feet, the snow kicked up by the track and by movement of the machine tends to accumulate in the recesses of the footwells. The accumulated snow not only adds undesirable weight to the machine, but it may also cause the rider's feet to slip from the snowmobile.

On other past snowmobiles, additional radiators are installed under the driver footrest area to melt accumulated snow. However, such additional radiators require additional space and add undesirable weight to the snowmobile.

SUMMARY OF THE INVENTION

The present invention provides a snowmobile having a liquid-cooled engine with an improved cooling system. A preferred embodiment of the snowmobile has a chassis with an endless drive track disposed in a longitudinally extending drive tunnel. Generally horizontal footrests extend outwardly laterally from opposite sides of the snowmobile chassis. The snowmobile also has left and right side coolers that dissipate heat generated by the engine. The side coolers extend longitudinally and are each mounted at an outer edge of a respective footrest to form a footwell. Each side cooler has a hollow interior that is in fluid communication with liquid-coolant passages inside the engine. These cooler interiors and engine passages define a coolant circuit. The snowmobile also has a pump that circulates coolant through the coolant circuit.

In an alternate embodiment, the side coolers also have a multitude of heat exchanging anti-skid studs that extend outward from the surface of each side cooler.

In another embodiment, the snowmobile also has front and rear heat exchangers that each have hollow interiors connected within the coolant circuit. The front and rear heat exchangers are mounted to the front and rear ends of the drive tunnel, respectively. The rear heat exchanger may even form an extension of the drive tunnel longitudinally rearward.

In yet another alternative embodiment, the snowmobile drive tunnel is made of a heat exchanging material and includes the footrests. In this embodiment, the side coolers are in thermal communication with a respective footrest to dissipate heat generated by the engine via the drive tunnel.

DETAILED DESCRIPTION OF THE INVENTION

Figure 1:
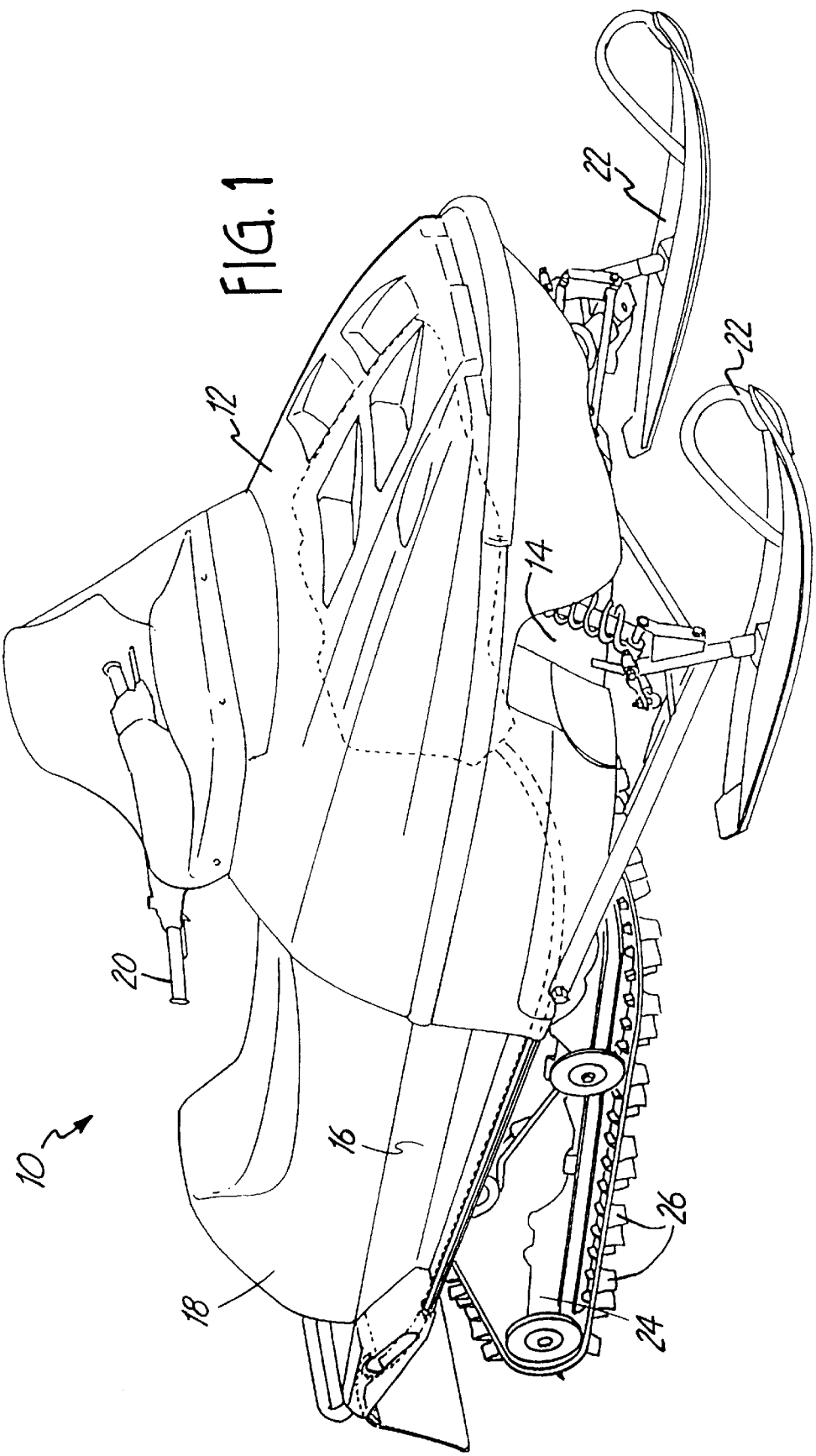
FIG. 1 is a perspective view of a snowmobile having an improved cooling system in accordance with one embodiment of the invention.

The drawings depict a preferred embodiment of a snowmobile incorporating the improved cooling system of the invention. It will be understood, however, that many of the specific details of the snowmobile with an improved cooling system illustrated in the drawings could be changed or modified by one of ordinary skill in the art without departing significantly from the spirit of the invention.

A snowmobile 10 having an improved cooling system in accordance with one embodiment of the invention is illustrated in FIG. 1. The snowmobile 10 includes a body assembly 12 made up of a number of parts which may be formed of suitable materials that cover and protect a support frame or chassis 14. The body 12 further includes a rear body portion 16 that accommodates a seat 18 adapted to seat one or more riders in straddle fashion. A handlebar assembly 20, positioned forwardly of the seat, is conventionally connected to a pair of front skis 22 for steering the snowmobile. The skis 22 are supported by a suitable front suspension system that is connected to the chassis 14.

Rearwardly of the front skis 22 and beneath the seat 18, the chassis 14 suspends an endless track assembly 24 by a suitable suspension. The endless track 24 has a plurality of spaced ribs 26 which extend from the exterior surface of the track. These ribs 26 not only provide traction to the endless track 24 but, as will be described below, assist in providing added cooling to the improved cooling system. The endless track 24 is driven by an internal combustion engine indicated generally by reference numeral 28 (shown in FIG. 2) that is supported by the chassis 14 and located in an engine compartment within the body 12 towards the front of the snowmobile 10.

The engine 28 is liquid-cooled and contains internal passages for carrying liquid coolant that absorbs heat generated by the engine 28 during operation. Although not expressly shown, the liquid cooled engine 28 contains a conventional pump 30 for establishing the circulation of the coolant liquid from the engine 28 through a coolant circuit. The pump 30 could also be a separate component.

Figure 2:
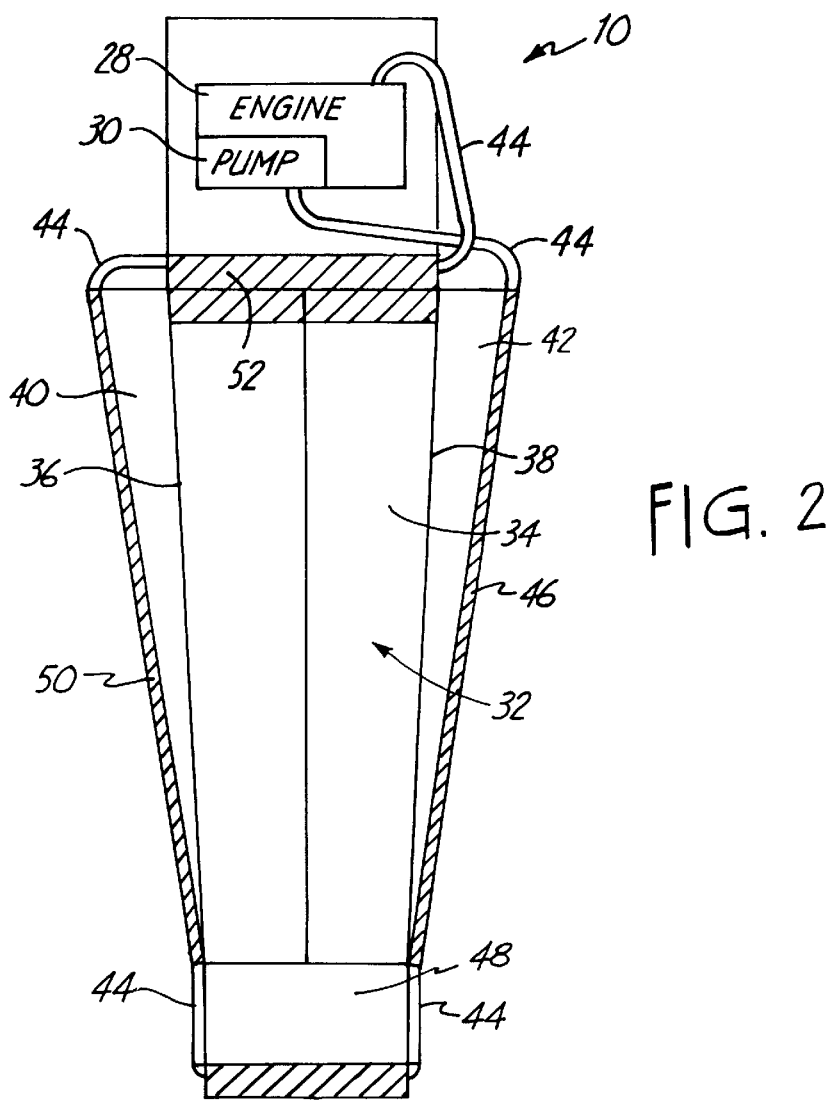
FIG. 2 is a top-view schematic diagram of the snowmobile having an improved cooling system shown in FIG. 1.

Beneath the seat area 18 and disposed around the endless drive track 24, the snowmobile 10 has a longitudinally extending drive tunnel 32 support frame supported by the chassis 14. The drive tunnel 32 can be made of a thermally conductive material such as aluminum. With reference to FIG. 2, the drive tunnel 32 has a top portion 34 under the seat 18. The top portion 34 connects to generally downwardly extending sidewalls 36, 38 (shown schematically in FIG. 3) that are positioned on opposite sides of the endless track 24 so that the endless track is disposed within the drive tunnel 32. Generally horizontal footrests 40, 42 extend outward from the chassis 14, or they extend outward from each sidewall 36, 38, respectively. The footrests 40, 42 can be made of a thermally conductive material and can be formed integrally with the drive tunnel 32 (and therefore being thermally conductive therewith). The width of the footrests 40, 42 preferably tapers rearwardly.

The elements of the coolant circuit will now be described. As stated above, the engine 28 is liquid-cooled. The pump 30 circulates liquid coolant (usually a water-ethylene glycol mixture) from internal passages of the engine (where heat generated by the engine would be absorbed by the coolant) to several heat exchanging radiators (where heat is dissipated). The coolant flows in a closed path or fluid circuit back to the engine.

Figure 3:
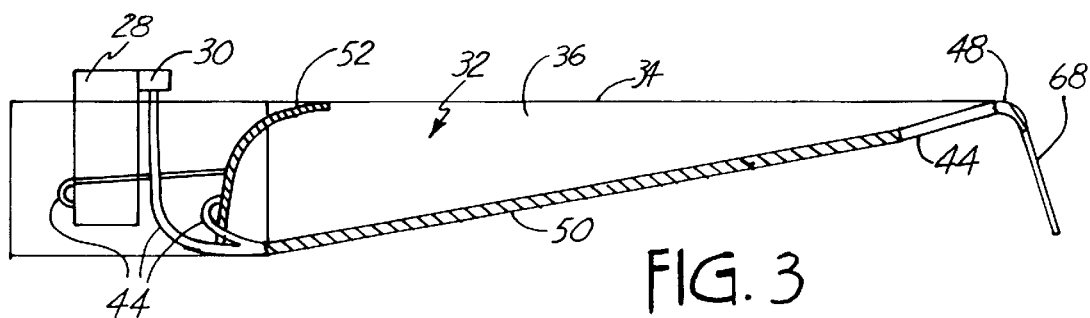
FIG. 3 is a side-view schematic diagram of the snowmobile having an improved cooling system shown in FIG. 1.
Figure 4:
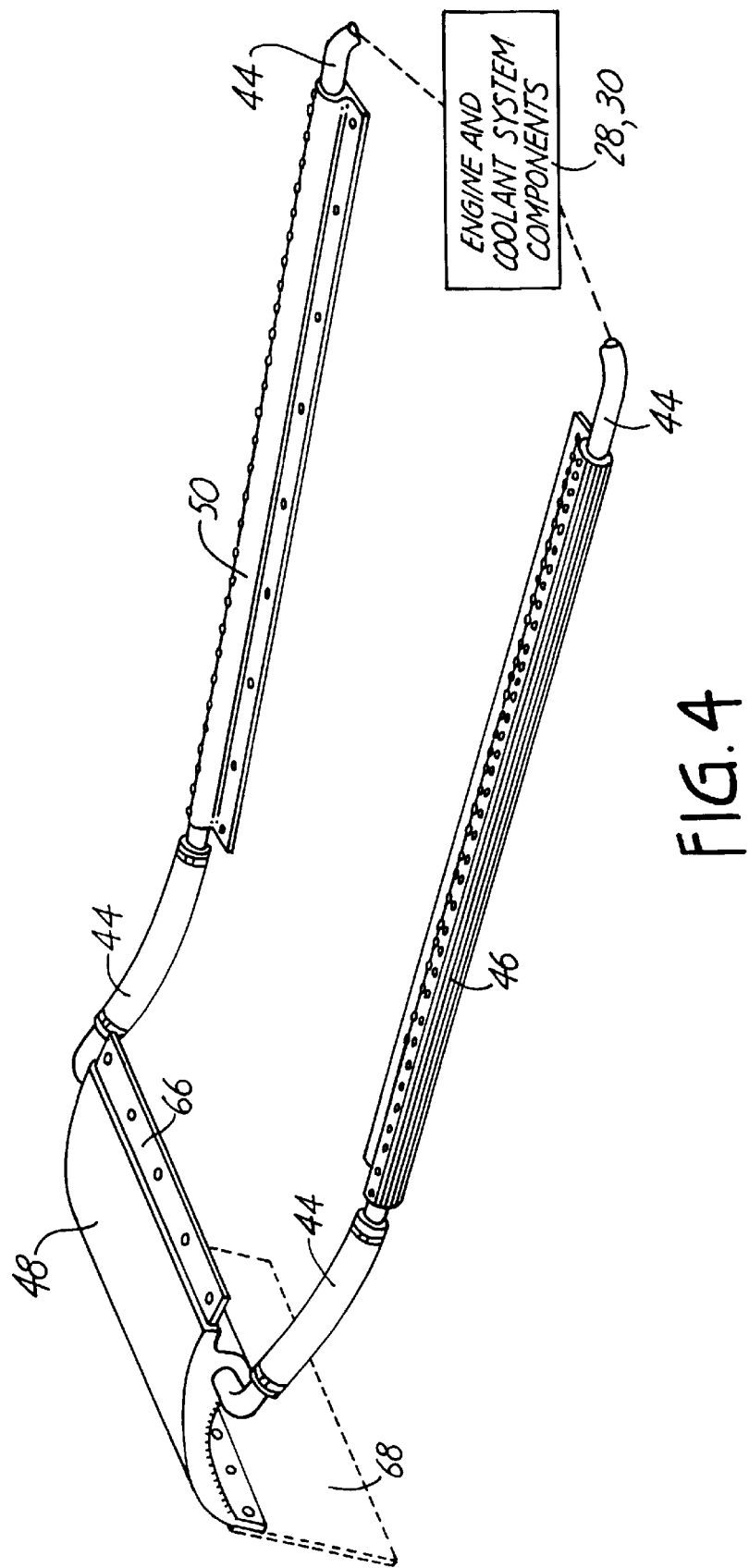
FIG. 4 is a schematic view of a portion of the improved cooling system of one embodiment of the present invention.

As shown schematically in FIGS. 2–4, the coolant is pumped by the pump 30 during engine operation from the engine 28 into a radiator hose or tube 44 leading to the first heat exchanger, a side cooler 46 on the right side of the snowmobile. From side cooler 46, the coolant flows into another tube 44 and then into the second heat exchanger, the rear cooler 48, via an inlet. The rear cooler 48 is a close-off or cross-over cooler that provides for circulation of the fluid from the right side of the tunnel 32 to the left side. Coming off the left side of the tunnel and from an outlet of the rear cooler 48, the coolant again flows through a tube 44 and into the third heat exchanger, a side cooler 50 on the left side of the snowmobile. From the side cooler 50, the coolant flows into another tube 44 that leads into an inlet for the fourth heat exchanger, the front cooler 52. From an outlet of the front cooler 52, the coolant, which is now cold, completes the loop or circuit and flows through another tube 44 and back into internal passages in the engine 28. The coolant circuit may also contain a coolant overflow reservoir. Alternatively, the tubes 44 could be eliminated and the coolers could be directly interconnected.

Each of the heat exchangers 46, 48, 50, and 52 are preferably made of a thermally conductive material such as aluminum which allows heat to be conducted from the coolant to the heat exchangers. The side coolers 46, 50 are preferably made of extruded aluminum.

Figure 5:
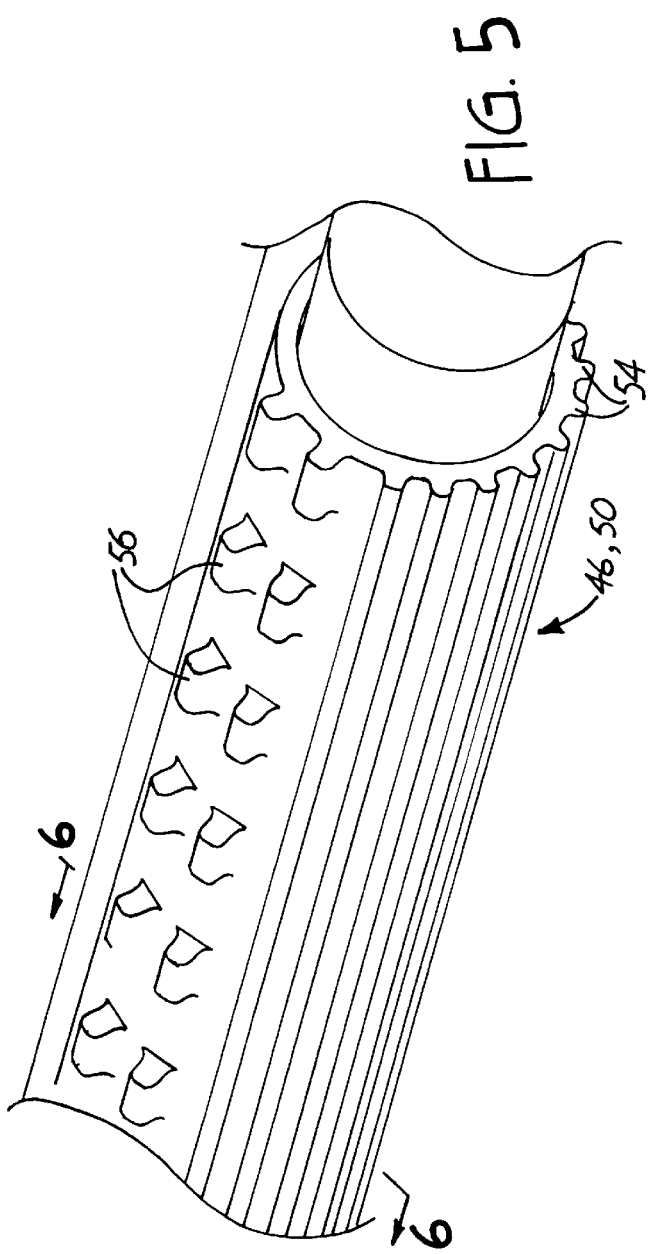
FIG. 5 is an enlarged perspective view, broken away from FIG. 4, of a portion of a side cooler in accordance with one embodiment of the invention.
Figure 6:
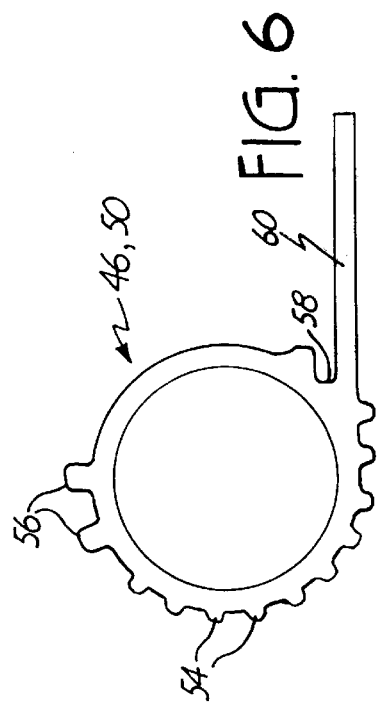
FIG. 6 is a cross-sectional view taken along the line 6—6 of FIG. 5.

A preferred design of the side coolers 46 and 50 is shown in FIGS. 5 and 6. As shown in these figures, the side coolers 46, 50 have an elongated, hollow interior 47 for conveyance of the coolant. The elongation preferably provides a cylindrical shape to the side coolers 46, 50. However, the hollow interior 47 may be of any cross-sectional shape, such as rectangular or such as the circular cross-section diagrammed in FIG. 6. Similarly, the exterior surface of the side coolers 46, 50 may also be of any cross-sectional shape, such as circular, rectangular, etc. The side coolers 46, 50 may also have several integrally formed heat exchanging fins 54 that extend radially outward from the side cooler 46, 50, and extend longitudinally along the length of the cooler 46, 50. The fins 54 increase the coolers' surface area to help radiate heat. The side coolers 46, 50 may also have heat exchanging anti-skid studs 56 formed integrally with the side cooler and that extend radially outward from the cooler 46, 50. The studs 56 may be arranged in rows along the length of the side cooler 46, 50. Like the fins 54, the studs increase the cooler's surface area to help radiate heat. In addition, the studs 56 provide an anti-skid mechanism as discussed below.

The side coolers 46, 50 are mounted at the outside edge of a respective footrest 40, 42. As shown in FIG. 6, the side coolers 46, 50 have a slot 58 that mates with the edge of the footrest for greater strength. When the slot 58 is mated with the edge of the footrest, a flat panel 60 on the side cooler is placed in direct contact with (and is preferably riveted to) the footrest. Since the side cooler and the footrest are preferably comprised of thermally conductive materials, the side cooler may dissipate heat into the footrest (and correspondingly into the drive tunnel if it is comprised of a thermally conductive material). By connecting the side cooler 46, 50 to the outer edge of the footrest, the side cooler and footrest form a footwell to help hold an operator's feet in Typically, footwells on past snowmobiles were formed in part by rolling the outer edges of the footrests into a "tunnel roll." These tunnel rolls are typically integrally formed with the tunnel and the footrests. In addition, the tunnels rolls are made of formed plastic or metal that merely provide an outer lip along the edge of the footrests that curls downward. The lip, along with additional foot guide components riveted on top of the footrests, help hold the riders' feet in place. Many of these tunnel rolls have been found to sag along their length when subjected to normal loads (e.g., the weight of the rider leaning over the roll during a turn, and/or hard impacts from irregular terrain). In extreme cases, the sag can result in permanent distortion of the tunnel roll shape.

The present invention replaces these tunnel rolls with side coolers 46, 50 and eliminates the need for other side radiators to be placed under the footrests (as explained below). The side coolers 46, 50 integrate the functions of the tunnel rolls, underfoot radiators, and separate anti-skid devices together, thereby saving much needed space and reducing the overall weight. In addition, the side coolers provide added strength against sagging along their length as compared to tunnel rolls. This is due, in part, to the fact that the side coolers 46, 50 have a fully closed periphery (creating the hollow interior), whereas the roll of tunnel rolls does not close upon itself.

During operation of snowmobiles, snow is often kicked up in the air by the endless track or by the movement of snowmobile. Some of this snow accumulates in the recesses of the snowmobile's footwells. The accumulated snow not only adds undesirable weight to the machine, but it may also cause the rider's feet to slip from the snowmobile.

The snowmobile 10 of the present invention helps solve these problems through the use of its improved cooling system. Besides providing additional heat exchanger surface area to the cooling system, the side coolers 46, 50 also increase the cooling system's capacity through their direct contact with snow kicked up into the snowmobile's footwells. The snow kicked up onto the side coolers 46, 50 and the footrests 40, 42 (when in thermal conductivity with the side coolers) is melted by the cooling system. The heat required to melt snow is substantial, so heat absorbed from the engine 28 is removed from the coolant rapidly. By providing this melting/cooling function, the side coolers 46, 50 eliminate the need for separate radiators located under the footrests.

The fins 54 and the studs 56 further increase the side cooler's cooling capacity by catching and holding the snow kicked up by the snowmobile. The studs 56 (and the fins 54 to a certain extent) also provide an anti-skid mechanism that helps hold the rider's feet in place by providing a rough surface for gripping the rider's boot.

The increased cooling capacity provided by the side coolers 46, 50 is provided without a corresponding increase in space consumed on the snowmobile. Space for radiators, like all space on snowmobiles, is limited. Past cooling systems used radiator hoses to transport coolant from the engine to a rear heat exchanger. The present invention's improved cooling system replaces much of this radiator hose with the like-sized side coolers 46, 50. The side coolers 46, 50 not only transport coolant to and from the rear cooler 48 (the function of past system's hoses), but they also add capacity to the cooling system without requiring added space on the snowmobile. Moreover, since the fins 54 and studs 56 (which even further increase the system's cooling capacity) are integrally formed on the side coolers, they, 54, 56 may be implemented without requiring the installation of a separate anti-skid mechanism.

Figure 7:
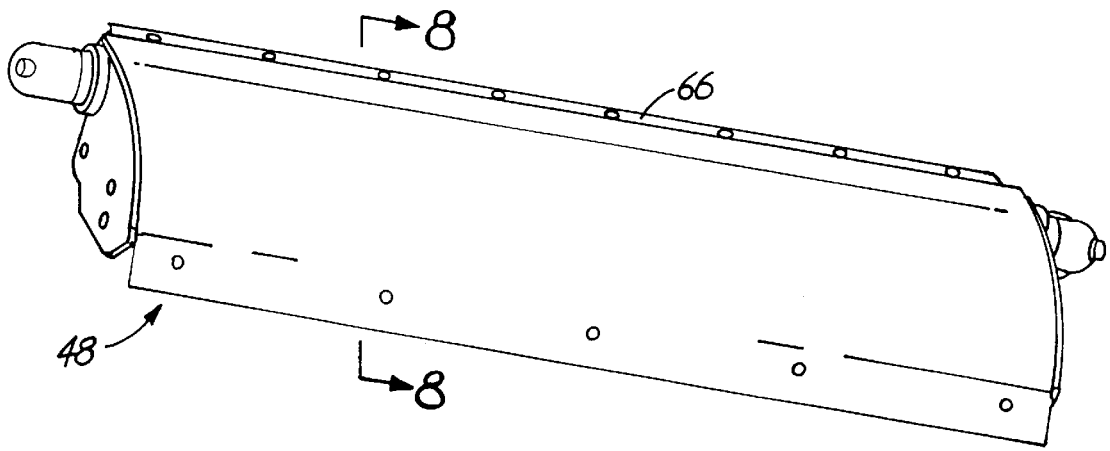
FIG. 7 is a perspective view of a rear cooler in accordance with one embodiment of the invention.
Figure 8:
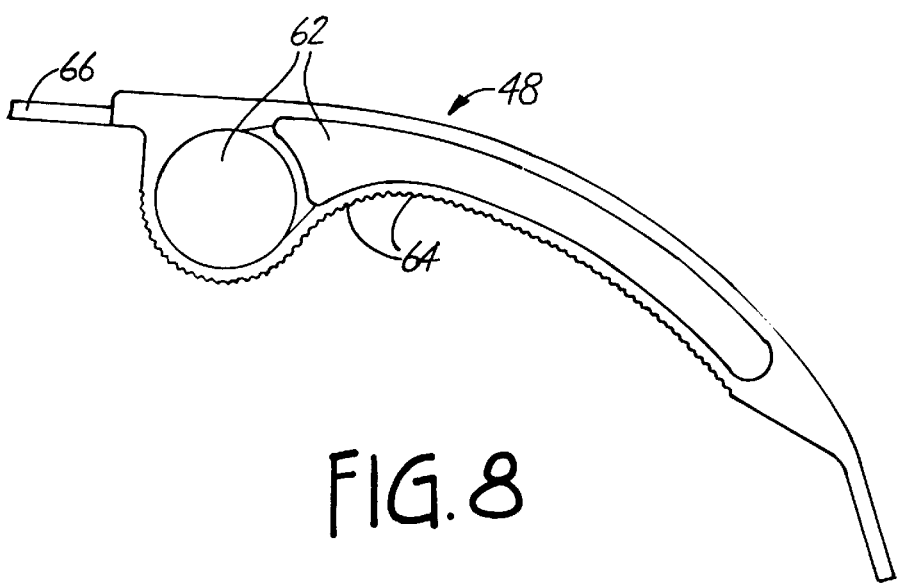
FIG. 8 is a cross-sectional view taken along the line 8—8 of FIG. 7.

A preferred design of the rear cooler 48 is shown in FIGS. 7 and 8. As shown in these figures, the rear cooler 48 preferably has a teardrop shaped hollow interior 62 for conveyance of the coolant from one side of the tunnel to the other. The rear cooler 48 may also have a series of integrally formed small fins or ridges 64 that extend outwardly downward on the underside of the cooler 48 and extend laterally along the width of the cooler 48. The ridges 64 increase the rear cooler's surface area to help radiate heat. The ridges also provide a rough surface to capture and hold snow kicked up by the movement of the endless track 24. The snow, of course, helps cool the coolant.

A panel 66 of the rear cooler 48 is preferably riveted to the rear of the drive tunnel 32. When connected together, the panel 66 and the rear of the drive tunnel 32 are placed in direct, thermal contact. Since the rear cooler 48 and the drive tunnel 32 are preferably comprised of thermally conductive materials, the rear cooler 48 may dissipate heat into the drive tunnel 32 to increase the system's cooling capacity. Being connected to the rear of the drive tunnel 32 (shown in FIG. 2), the rear cooler 48 extends the length of the drive tunnel 32 rearward and mounts the rear cooler 48 adjacent to the rear of the drive track 24. In such a position, the ridges 64 on the rear cooler 48 face the rear of the drive track 24 and are located in the path of snow circulated by the track during operation. In addition, the ribs 26 on the endless track 24 act like fan blades during movement of the track assembly 24 that create convection currents of air moving towards the ridges 64 on the rear cooler 48 for enhanced heat exchange.

A flexible (rubberized) snow flap 68 (shown in FIGS. 3 and 4) may be connected to the rear of the rear cooler 48 to prevent the endless track 24 from throwing snow or other materials out the back of the snowmobile 10.

Figure 9:
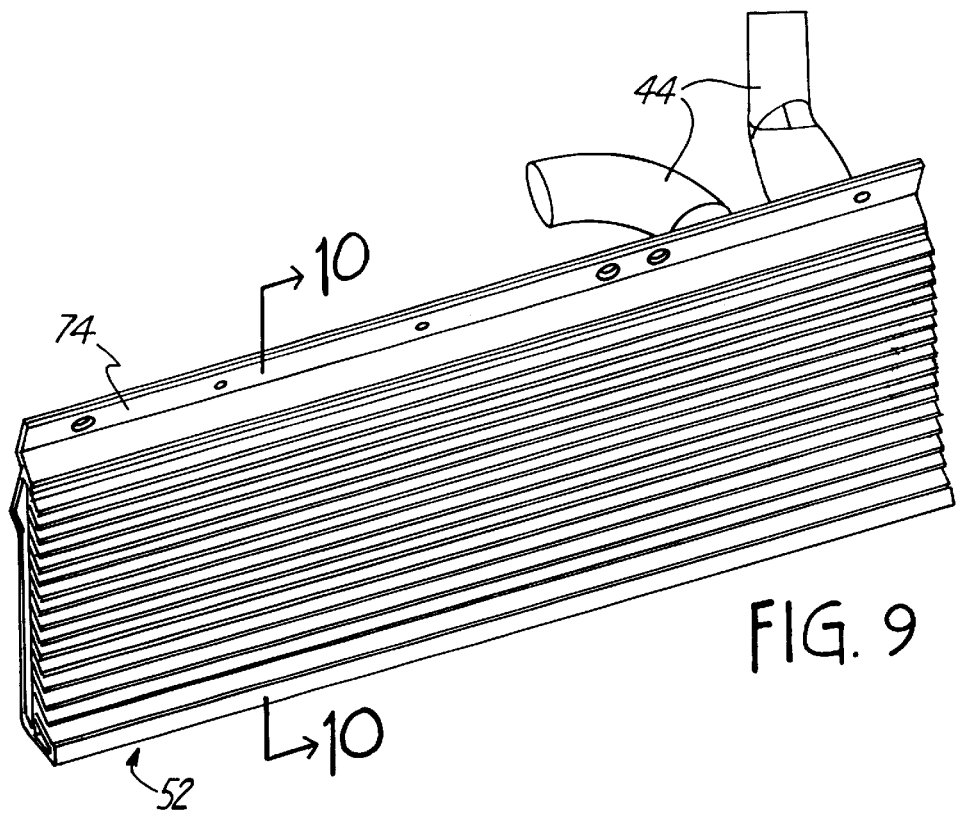
FIG. 9 is a perspective view of a front cooler in accordance with one embodiment of the invention.
Figure 10:
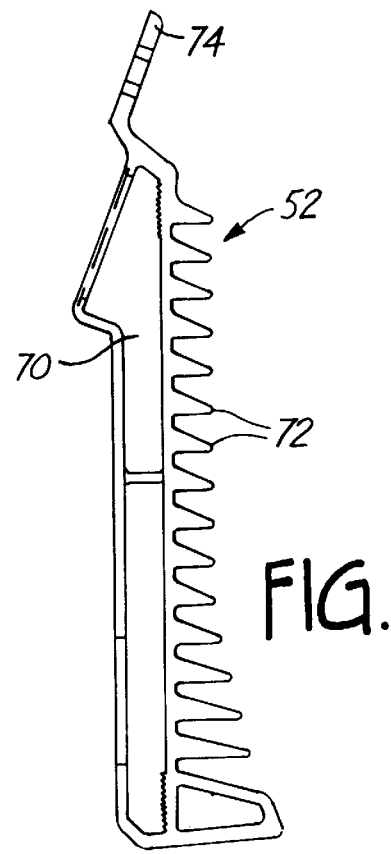
FIG. 10 is a cross-sectional view taken along the line 10—10 of FIG. 9.

A preferred design of the front cooler 52 is shown in FIGS. 9 and 10. As shown in these figures, the front cooler 52 has a hollow interior 70 for conveying coolant. The front cooler 52 may also have a series of relatively large fins 72 that extend outward from the backside of the front cooler, facing the front of the endless track 24. The fins 72 increase the front cooler's surface area to help radiate heat. The fins also help trap and hold snow kicked up and thrown by the endless track 24 during operation. The front cooler 52 is preferably the largest cooler in the coolant circuit, and therefore provides the greatest heat exchange. Accordingly, coolant flows through the front cooler 52 last before it returns to the engine 28. Otherwise, before reaching the side coolers 46, 50, the coolant might already be too cold to melt snow from the side coolers 46, 50 before it reaches the side coolers 46, 50.

A panel 74 of the front cooler 52 is preferably riveted to the front of the drive tunnel 32, placing the components in thermal communication if they are comprised of thermally conductive materials. Such communication allows the front cooler 52 to dissipate heat into the drive tunnel 32 to increase the system's cooling capacity.

While a preferred embodiment of the present invention has been described, it should be understood that various changes, adaptations and modifications may be made therein without departing from the spirit of the invention and the scope of the appended claims.

What is claimed is:

1. A snowmobile having a liquid-cooled engine, the snowmobile comprising:

a chassis including a longitudinally extending drive tunnel having an endless drive track disposed therein, generally horizontal footrests extending outwardly laterally from opposite sides of the chassis;

left and right elongate side coolers that dissipate heat generated by the engine, each side cooler having a hollow interior in fluid communication with liquid coolant passages inside the engine defining a coolant circuit, each side cooler extending longitudinally and mounted at an outer edge of a respective footrest and extending above the respective footrest to form a footwell between the side cooler, the respective footrest and the drive tunnel; and a pump for circulating coolant through the coolant circuit.

2. The snowmobile of claim 1, wherein each side cooler has a plurality of heat exchanging anti-skid studs extending outward from the surface of each side cooler.

3. The snowmobile of claim 2, wherein the heat exchanging studs are arranged in at least two longitudinally extending rows along each longitudinally extending side cooler.

4. The snowmobile of claim 1, wherein each side cooler has a plurality of elongated heat exchanging fins that dissipate heat from the coolant circuit.

5. The snowmobile of claim 1 further including front and rear heat exchangers having hollow interiors connected within the coolant circuit, the front and rear heat exchangers mounted to a front and rear of the drive tunnel respectively.

6. The snowmobile of claim 5 wherein the rear heat exchanger forms an extension of the drive tunnel longitudinally rearward.

7. The snowmobile of claim 5, wherein the heat exchangers are mounted adjacent to the drive track and in the path of snow circulated by the track during operation.

8. The snowmobile of claim 5, wherein each heat exchanger has a plurality of enlongated fins for dissipating heat from the coolant circuit.

9. The snowmobile of claim 5, wherein hoses connect the side coolers to the front and rear heat exchangers in the coolant circuit.

10. The snowmobile of claim 1 further including a rear heat exchanger connected within the coolant circuit, the rear heat exchanger forms an extension of the drive tunnel longitudinally rearward.

11. The snowmobile of claim 10, wherein the pump circulates coolant to the rear heat exchanger via one of the side coolers.

12. The snowmobile of claim 1, wherein the footrests are made of thermally conductive material, and each footrest being in thermal communication with a respective side cooler to dissipate heat from the side cooler.

13. The snowmobile of claim 1, wherein the footrests are made of thermally conductive material, and each footrest being in thermal communication with a respective side cooler to dissipate heat generated by the engine into the footrests.

14. The snowmobile of claim 1, wherein the hollow interior of the elongate side coolers has a circular cross-section.

15. The snowmobile of claim 14 wherein a portion of the hollow interior of each side cooler extends above the respective footrest.

16. A snowmobile having a liquid-cooled engine, the snowmobile comprising:

a longitudinally extending drive tunnel having an endless drive track disposed therein, the drive tunnel having a top portion defining an operator seat area and generally downwardly extending sidewalls positioned on opposite longitudinal sides of the track, the drive tunnel having generally horizontal footrests extending outwardly laterally from each sidewall;

left and right elongate side coolers each having a hollow interior in fluid communication with liquid coolant passages in the engine defining a coolant circuit that dissipates heat generated by the engine, each side cooler extending longitudinally and mounted at an outer edge of a respective footrest and extending above the outer edge of the respective footrest to define a footwell with the respective footrests and sidewalls; and a pump for circulating coolant through the coolant circuit.

17. The snowmobile of claim 16, wherein each side cooler has heat exchanging anti-skid studs extending outward from the surface of each side cooler.

18. The snowmobile of claim 16, wherein the drive tunnel is made of thermally conductive material, and each footrest being in thermal communication with a respective side cooler to warm the drive tunnel with heat generated by the engine.

19. The snowmobile of claim 16, wherein the drive tunnel is made of thermally conductive material, and each footrest being in thermal communication with a respective side cooler to dissipate heat generated by the engine into the drive tunnel.

20. The snowmobile of claim 16, wherein the hollow interior of the elongate side coolers has a circular cross-section.

21. The snowmobile of claim 16, wherein the elongate side coolers have a circular cross-section.

22. The snowmobile of claim 21 wherein a portion of the hollow interior of each side cooler extends above the outer edge of the respective footrest.

23. A snowmobile having a liquid-cooled engine, the snowmobile comprising:

a chassis including a longitudinally extending drive tunnel having an endless drive track disposed therein, generally horizontal footrests extending outwardly laterally from opposite sides of the chassis;

left and right elongate side coolers that dissipate heat generated by the engine, each side cooler having a hollow interior in fluid communication with liquid coolant passages inside the engine defining a coolant circuit, each side cooler extending longitudinally and mounted at an outer edge of a respective footrest to form a footwell, each side cooler having a plurality of heat exchanging anti-skid studs extending outward from the surface of the respective side cooler; and a pump for circulating coolant through the coolant circuit.

24. The snowmobile of claim 23, wherein the heat exchanging studs are arranged in at least two longitudinally extending rows along each longitudinally extending side cooler.

25. A snowmobile having a liquid-cooled engine, the snowmobile comprising:

a longitudinally extending drive tunnel having an endless drive track disposed therein, the drive tunnel having a top portion defining an operator seat area and generally downwardly extending sidewalls positioned on opposite longitudinal sides of the track, the drive tunnel having generally horizontal footrests extending outwardly laterally from each sidewall;

left and right elongate side coolers each having a hollow interior in fluid communication with liquid coolant passages in the engine defining a coolant circuit that dissipates heat generated by the engine, each side cooler extending longitudinally and mounted at an outer edge of a respective footrest to form a footwell, each side cooler having heat exchanging anti-skid studs extending outward from the surface of the respective side cooler; and a pump for circulating coolant through the coolant circuit.

* * * * *